United States Patent [19]

Cunningham

[11] Patent Number: 4,678,569

[45] Date of Patent: Jul. 7, 1987

[54] APPARATUS FOR SEPARATING HONEY AND BEESWAX

[76] Inventor: Howard W. Cunningham, Rte. 1, Box 249-E, Parkersburg, W. Va. 26101

[21] Appl. No.: 834,963

[22] Filed: Feb. 28, 1986

[51] Int. Cl.⁴ ............................................. B01D 35/18
[52] U.S. Cl. ................................. 210/187; 210/532.1
[58] Field of Search ............... 210/182, 187, 184, 186, 210/513, 532.1

[56] References Cited

U.S. PATENT DOCUMENTS

| | | | |
|---|---|---|---|
| 2,248,893 | 7/1941 | Parent | 210/52.5 |
| 3,315,883 | 4/1967 | Meier | 233/11 |
| 3,343,678 | 9/1967 | Olson | 210/182 |
| 3,448,860 | 6/1969 | Eckdahl | 210/182 |
| 4,021,639 | 5/1977 | Espino | 219/201 |
| 4,385,990 | 5/1983 | Cale | 210/187 |

FOREIGN PATENT DOCUMENTS 2144130 3/1973 Fed. Rep. of Germany ............ 59/6

15408 10/1897 Switzerland .

Primary Examiner—Frank Sever
Attorney, Agent, or Firm—Fisher, Christen & Sabol

[57] ABSTRACT

An apparatus and method using the apparatus for separating honey and beeswax from capping and refuse is disclosed. The apparatus includes a container, partially covered by a cap. A trough is formed between a side wall of the container and the side of the cap. Capping placed in the trough block heat from escaping the container when the heat requirement is high. When most of the capping in the container and troughs has been melted and the heat requirement is low, excess heat escapes through the open troughs. The capping in the container is heated by a conventional radiant heater placed below the cap and directing heat into the container and the honey is separated from melted beeswax and other refuse, by removing the different melted layers.

10 Claims, 5 Drawing Figures

APPARATUS FOR SEPARATING HONEY AND BEESWAX

BACKKGROUND OF THE INVENTION

1. Field of the Invention

The invention relates to an apparatus of separating honey from beeswax and refuse of cappings.

2. Prior Art

It is customary in the honey industry to slice off the thin wax layers which overlie the face of the comb prior to starting the removal of honey from the comb. The sliced off thin wax layers are generally referred to as cappings. These cappings contain honey, beeswax and other refuse. The industry has tried to recover the honey from beeswax and other refuse in the cappings by various apparatuses and methods.

Since these three components of cappings have different specific gravities, separation by settling or centrifuging was tried but was found to be unsatisfactory because the honey was not entirely separated from the beeswax and refuse. Heating the mixture, on the other hand, results in a complete separation of the components. However, honey derived from such separation processes can be darkened as a result of overheating. Darkened honey is less desirable and is sold at reduced prices compared with light-colored honey.

U.S. Pat. No. 2,248,893 discloses an apparatus in which heating coils are immersed in a melted beeswax layer floating on a pool of honey in a substantially closed vessel having no effective means for venting the heat generated by the heating coils and in which the cappings must move through the pool of honey to reach the heating coils. It seems inevitable that some honey will be carried by the cappings into contact with the heating coils and be in danger of becoming discolored.

In U.S. Pat. No. 3,315,883 apparatus is disclosed in which a flowing layer of honey is formed on which the unmelted capping is floated towards a baffle where a radiant heat source melts a narrow band of cappings to release honey just before the resulting melted beeswax passes over the crest of the baffle carrying with it the refuse, e.g., slumgum, contained in the cappings. The apparatus is complicated and appears to be difficult to control so that little, if any, honey is lost over the baffle and additional apparatus including heating means is needed to separate the refuse from the beeswax. Furthermore, the radiant heat source must be powerful enough to quickly melt the capping before it passes over the baffle and increases the risk of darkening the honey.

U.S. Pat. Nos. 4,385,990; 3,448,860 and 3,343,678 and Swiss Pat. No. 15408 each describe open box-like receptacles for separating honey, beeswax and refuse from cappings. These apparatuses have the problem of controlling temperature at an appropriate level for melting the beeswax without overheating the honey. In addition, there is a substantial amount of heat lost through the open top of these apparatuses.

German Offenlegunschrift No. 21 44 130 discloses a beehive frame wax melter utilizing three heating bars or coils mounted under an inclined surface onto which cappings can be placed to melt the beeswax content and release honey. Since the honey would flow along substantially the entire length of the surface it is likely to be exposed to temperatures high enough to darken it.

In view of the above-mentioned and other difficulties, a novel apparatus and method for separating honey from beeswax and refuse, which solves these problems is disclosed.

None of the above-mentioned prior art discloses or suggests apparatus that is simple in design and operation and is capable of separating beeswax and honey from cappings with high efficiency, e.g., with minimal heat loss and without damaging, i.e., darkening, the honey. More specifically, none of the prior art discloses an apparatus having an inherent heat-regulating capability whereby heat within the apparatus is vented at such time that a capping load has been substantially melted down thus avoiding honey-damaging heat buildup within the apparatus.

SUMMARY OF THE INVENTION

The novel apparatus is based on the principles of specific gravity and a heat-venting louver effect. As stated above, the three materials, honey, melted beeswax and refuse, have different specific gravities, and form different layers which can be drawn off to recover the different products. Besides achieving quick, complete separation of the materials, the novel apparatus is designed to substantially avoid direct heating of the honey, thus eliminating or substantially avoiding the browning of the separated honey. The novel apparatus includes a cap designed to overlay an open-top container and to form a trough with the container and a radiant heating means mounted beneath the cap to radiate heat into the container. The trough opens at its bottom into the container and receives cappings to be melted. When the trough is full, cappings in the trough block heat from escaping through the trough thus increasing melting efficiency while reducing to a minimum the loss of heat through the trough, thus using minimum energy to heat and melt the cappings. The apparatus further provides automatic cooling when the batch of cappngs in the trough are melted, thus opening the trough to vent heat through it. Overheating and browning of the honey is thereby avoided.

The novel apparatus is simple in construction, has no moving parts, is easy to operate, keep clean and maintain.

DETAILED DESCRIPTION OF THE INVENTION

Figure 1:
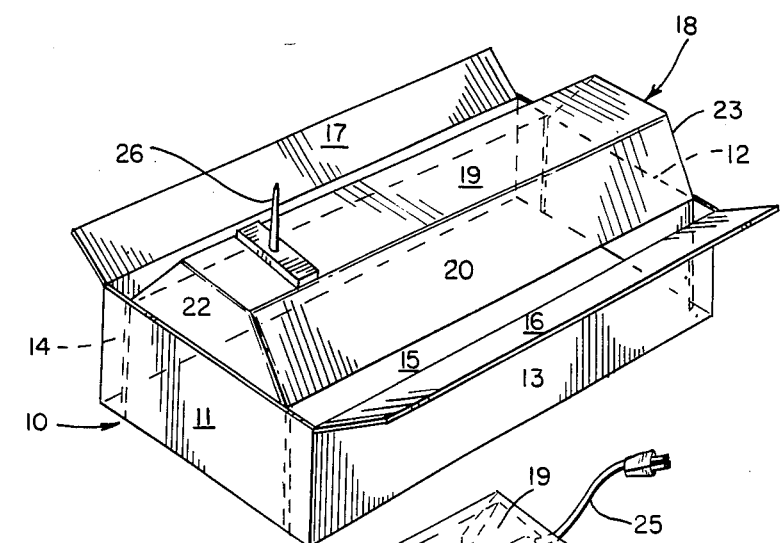
FIG. 1 is a perspective view of the apparatus of this invention, not showing the melted wax drain conduit, honey drain pipe, their associated baffles or the infrared heater for simplicity.
Figure 2:
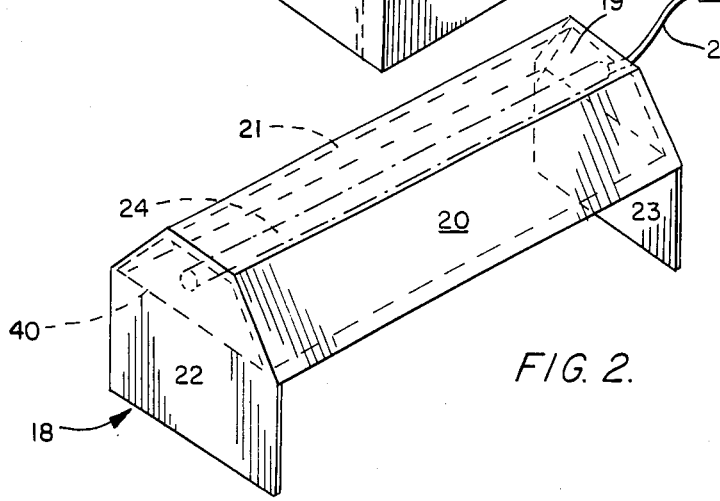
FIG. 2 is a perspective view of the cap of the novel apparatus shown in FIG. 1 also illustrating the infrared heater.
Figure 3:
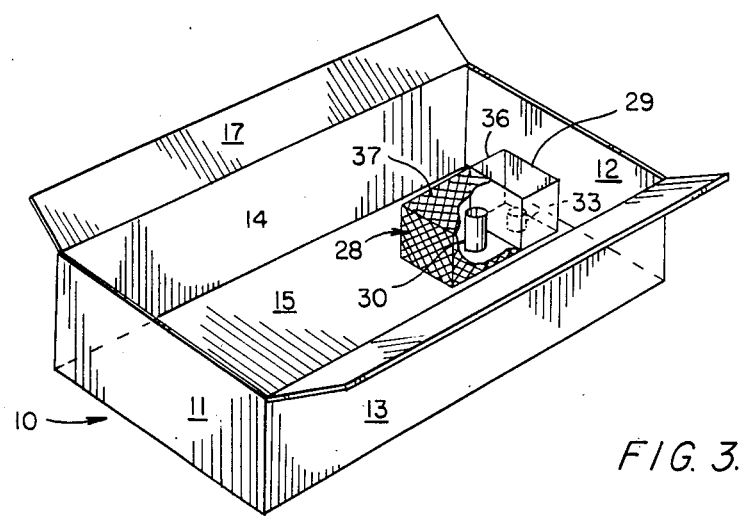
FIG. 3 is a perspective view of the open-top container of the novel apparatus shown in FIG. 1 illustrating the melted wax drain conduit and the honey drain pipe and their associated baffles, the perforate baffle around said melted wax drain conduit being shown in partial cutaway.

Referring now to the drawings, there is shown in FIGS. 1, 2 and 3 a preferred embodiment of the apparatus of this invention comprising a container 10 having end walls 11 and 12 and side walls 13 and 14, a bottom 15 and slanted panels 16, 17 attached to each side wall 13, 14, respectively. The slanted panels 16, 17 extend diagonally upwardly from the side walls 13, 14 such that material such as cappings falling on the slanted panels slide or roll by gravity into the container. The novel apparatus also includes a cap 18 which comprises a generally flat top 19 and a pair of slanted surfaces 20, 21 connected on opposite sides of the generally flat top 19. The cap 18 also includes end walls 22 and 23 connected to the flat top 19 and the slanted surfaces 20, 21. An infrared heater 24 is mounted in the cap 18 beneath flat top 19 and extending between end walls 22, 23. An electrical supply cord 25 is provided for supplying electrical power to the infrared heater. A heat deflector 40 is preferably positioned above and on all sides of infrared heater 24 and is also spaced from the inner surfaces of cap 18 so that the slanted surfaces 20, 21 do not become overheated and honey contacting said surfaces is not discolored. The cap 18 is shaped and proportioned to fit within the container 10 such that the end walls 22, 23 fit within the container and engage the container bottom 15 to support the cap 18.

Figure 4:
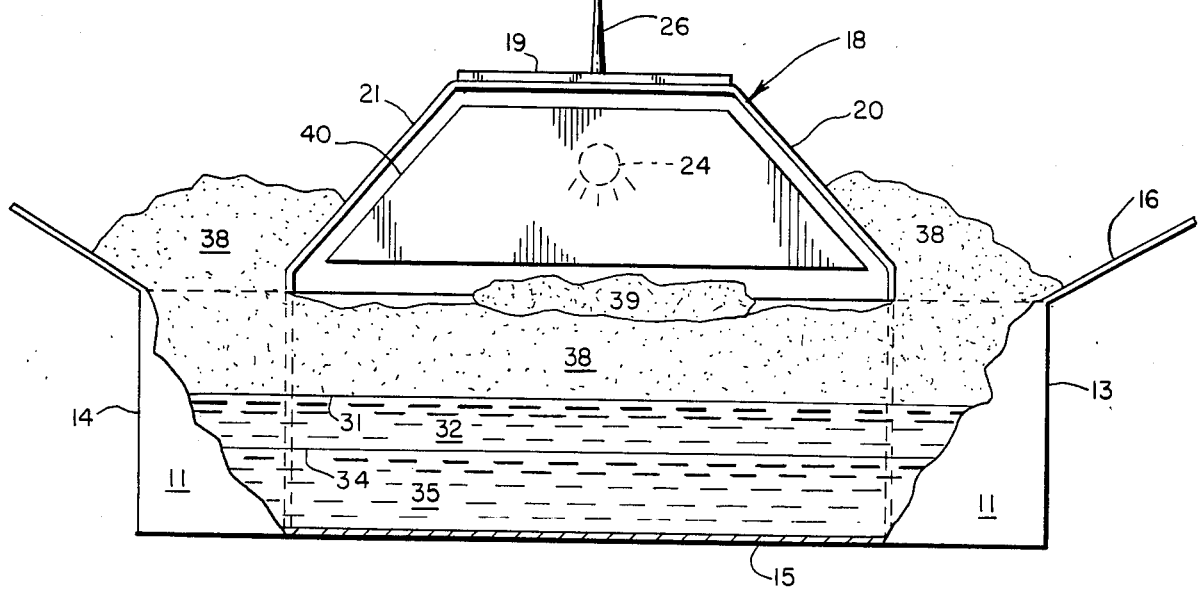
FIG. 4 is an end view of the novel apparatus, the end wall of the container thereof being partly cutaway illustrating the capping loading, honey level, melted wax level and refuse location during operation of the apparatus, the end wall of the cap being cutaway to illustrate the infrared heater and its heat shield.

As shown in FIGS. 1 and 4, the cap 18 can be provided with an impaling spike 26 mounted on the upper surface of flat top 19 for purposes of impaling a honey frame 27 to facilitate removal of honey and wax cappings from the frame 27 as best shown in FIG. 4.

Figure 5:
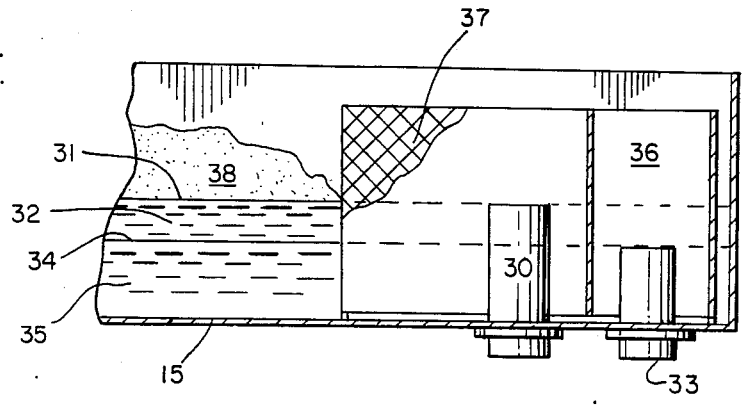
FIG. 5 is a cross-sectional view illustrating the honey level, melted wax level and capping level in the container of the aparatus shown in FIGS. 1-4 in relation to the melted wax drain conduit and honey drain pipe of said aparatus, the perforate baffle being shown partially cut-away to better illustrate the melted wax drain conduit.

As best shown in FIGS. 3 and 5, the container 10 is provided with mean 28 for removing the melted beeswax and means 29 for removing released liquid honey from container 10. The means for removing melted beeswax comprises a wax drain conduit 30 extending through the bottom 15 of container 10. The top of the wax drain conduit 30 is open and is located at the desired upper level 31 of the melted beeswax layer 32. The wax drain conduit 30 is fixed to the bottom 15 by any suitable means that provides a liquid tight seal. The means for removing released liquid honey includes drain pipe 33 which extends through the bottom 15 and has an open upper end at the upper level 34 of the honey layer 35. The honey drain pipe 33 is connected to the bottom 15 by means of any suitable liquid tight seal.

A non-perforate baffle 36 is mounted on the bottom 15 of container 10 to surround the honey drain pipe 33 with non-perforate walls that extend upwardly from a point spaced slightly above bottom 15, e.g., about one-eighth inch or so, sufficient to allow the flow of released liquid honey under the non-perforate baffle and thence upward to the open upper end of honey drain pipe 33 and then through the open upper end into said drain pipe and out of container 10. The non-perforate baffle 36 extends upwardly to a point above the cappings level and prevents melted wax and capping from entering honey drain pipe 33. The wax drain pipe is surrounded by a perforate baffle 37 such as expanded metal, screening, and the like, to allow wax to flow through said perforate baffle to the open upper end of melted wax drain conduit 30 and to prevent cappings 38 from reaching the upper end of the melted wax drain pipe. Although the upper ends of the non-perforate and perforate baffles 36 and 37 are shown as open, it may be desirable to cover said upper ends with perforate or non-perforate covers (not shown).

Referring to FIG. 4, the interior of the novel apparatus is shown to illustrate the general relative locations of the capping 38, the melted wax layer 32 and the liquid honey layer 35 and their respective upper levels 31 and 34 as well as the general location of refuse 39 formed during the melt down. As shown in FIG. 4, the honey frame 27 is positioned above the cap 18 and capping is removed therefrom and caused to fall into the troughs formed between slanted panel 16 and slanted surface 20 and also into the trough formed between slanted panel 17 and slanted surface 21. Initially the cappings fill the troughs and melt down to free liquid honey which collects as layer 35 and the beeswax melts down to form the layer of melted beeswax 32 which floats on the surface 41 of the cappings 38. The air space between inner surfaces of cap 18 (i.e., the inner surfaces of flat top 19 and slanted surfaces 20, 21) and the heat deflector 40 insulate said inner surfaces from the infrared heat source 24 and prevent overheating of those parts of the cap 18 contacted by the cappings. Consequently, honey contacting any surface of the cap 18, e.g., when moving down surface 20 or 21 into the container 10 is not overheated and does not discolor. Additional honey frames 27 are emptied to fill the respective troughs mentioned above and the container 10 above the honey layer 35 with cappings.

The infrared heater 24 radiates heat downwardly onto the surface of the cappings to melt the beeswax and release liquid honey which drops down by gravity through the capping layer 38 to enter and become a part of the honey layer 35. When the respective troughs are filled with cappings 38 as shown in FIG. 4, little, if any, heat escapes through the troughs but is utilized mainly in supplying the heat of fusion to melt the beeswax in the cappings. The heat of fusion required in the melting process maintains the temperature under the cap 18 at a sufficiently low level to prevent discoloration of the liquid honey. As the cappings 38 melt down to the extent that cappings no longer fill the troughs, the troughs open up to permit the venting of excess heat generated under the cap 18 by the infrared heater 24. In this way adequate heat is available when necessary to melt the cappings and when the load of cappings in the troughs and in the container 10 is reduced such that there is a danger of excess heat build-up because of less quantities of unmelted beeswax to absorb heat as the heat of fusion in melting, the troughs are open to avoid excess heat build-up by permitting the heat to escape out through the open troughs. When the troughs are filled up again with cappings, the cappings trap the heat within the cap 18 to thereby provide adequate heat for supplying the heat of fusion needed to melt the cappings. The heat cap 18 acts to force the cappings down and up toward the heat source 24 (see FIG. 4). As the cappings fall on the heat cap 18, they are prewarmed and flow into the container 10. The heater 24 located under the heat cap 18 melts the cappings and the wax and honey run out their separate drains 30 and 33. The heat cap 18 acts as a door keeping heat in unlike open melters of the prior art. As cappings 38 build up they block the openings reducing heat loss, thus increasing the melting efficiency. As cappings melt down, the venting space increases, releasing heat from under the cap to prevent overheating of the honey or wax by maintaining the temperature in the range of 85° F. to 105° F. Most of the refuse 39 floats on the surface of the melted beeswax and is forced under the heat cap 18 and heater 24 by incoming cappings 38. The refuse is baked under the heater 24 to form crisp chunks that are easily removed. From time to time, if desired, the refuse 39 can be removed by raising the cap 18 and scooping out the refuse.

The novel apparatus provides a facile and efficient means for separating honey and beeswax from cappings and recovering each of these products in relatively pure form. The novel apparatus comprises remarkably few components and is relatively inexpensive to manufacture and use and is highly efficient in separating and recovering honey and beeswax separately from cappings. In addition, it is obvious that cleaning of the novel apparatus after use is greatly simplified and maintenance is minimized because of the absence of moving parts and because of the simplicity of construction of the novel apparatus.

Although the invention has been herein shown and described in what is conceived to be the most practical and preferred embodiment, it is recognized that departures may be made therefrom within the scope of the claimed invention, which is not to be limited to the illustrative details described.

What is claimed is:

1. A beeswax capping separator for recovering honey from beeswax and refuse in cappings, said apparatus comprising:
   (1) means designed for inherently regulating the heat within the apparatus by the amount of cappings load in said apparatus such that, at high cappings load, heat is consumed by melting the wax in said cappings and, at low cappings load, heat is inherently vented from said apparatus thereby precluding honey-damaging heat buildup including
      (a) a container having an open top, a bottom and side walls defining a chamber in said container;
      (b) a cap spaced above the bottom of said container and covering part of the container below it, said cap being spaced from at least one side-wall of said container to define a feed opening therewith, said feed opening being adapted to receive said cappings;
      (c) heating means mounted in said chamber beneath said cap for heating cappings in said chamber to melt the beeswax and release the liquid honey from said cappings, the resulting melted beeswax and released liquid honey flowing to form a layer of released liquid honey adjacent the bottom of said container, and a layer of melted beeswax overlying the honey layer;
   (2) means for removing the melted beeswax from said container; and
   (3) means for removing the released liquid honey from said container, said means for removing melted beeswax and said means for removing honey being adapted to maintain said cappings and layer of melted beeswax at a level spaced below said cap and heating means thereby permitting said cappping to pass beneath said cap and heating means.

2. The apparatus as defined in claim 1, wherein the cap includes a pair of opposed upstanding end walls, said end walls being connected by means of a roof having a flat top and a pair of slanted surfaces connected on opposite sides of said flat top, said container having two opposed slanted panels, which define two troughs with the slanted sides of said cap.

3. The apparatus as defined in claim 2, wherein said heating means is an infrared heater mounted on the underside of said flat top and adapted to radiate heat downwardly into said container.

4. The apparatus as defined in claim 3 wherein said means for removing released liquid honey from said container comprises a pipe passing through the bottom of said container and extending upwardly and having an opening into said layer of honey.

5. The apparatus as defined in claim 4 wherein a non-perforate baffle having walls extending above the layer of melted beeswax above the layer of cappings is mounted in said container to enclose said pipe, said non-perforate baffle being spaced from the bottom of said container and said pipe to allow honey to flow under said non-perforate baffle and upwardly into said pipe opening whereby melted wax and refuse and melted cappings are held away from said opening by said baffle.

6. The apparatus as defined in claim 5 wherein said non-perforate baffle has a non-perforate top.

7. The apparatus as defined in claim 5 wherein said means for removing melted wax comprises a conduit extending into and having an opening into said layer of melted beeswax.

8. The apparatus as defined in claim 7 wherein a perforate baffle is provided to surround said conduit, allowing melted wax to flow therethrough and prevent refuse and unmelted cappings from entering said conduit.

9. The apparatus as defined in claim 3 wherein said infrared heater and cap are provided with a heat deflector positioned between said heater and said cap to prevent overheating of said cap.

10. The apparatus as defined in claim 1, wherein said side wall from which said cap is spaced is slanted upwardly and away from said feed opening whereby cappings placed on said slanted side wall are directed into said opening.

* * * * *